(12) United States Patent
Tripi

(10) Patent No.: US 9,737,975 B1
(45) Date of Patent: Aug. 22, 2017

(54) CLAMPING TOOL

(71) Applicant: Tim Tripi, Warren, MI (US)

(72) Inventor: Tim Tripi, Warren, MI (US)

( * ) Notice: Subject to any disclaimer, the term of this patent is extended or adjusted under 35 U.S.C. 154(b) by 0 days.

(21) Appl. No.: 15/465,929

(22) Filed: Mar. 22, 2017

Related U.S. Application Data

(60) Provisional application No. 62/319,828, filed on Apr. 8, 2016.

(51) Int. Cl.
    *B25J 15/08*     (2006.01)
    *B25B 5/10*     (2006.01)
    *B25B 5/04*     (2006.01)
    *B25J 1/04*     (2006.01)

(52) U.S. Cl.
    CPC ............... *B25B 5/10* (2013.01); *B25B 5/04* (2013.01); *B25J 1/04* (2013.01)

(58) Field of Classification Search
    CPC ...... B25B 5/10; B25B 5/04; B25J 1/04; F16B 45/00
    USPC ......... 294/115, 116, 26, 169, 106, 198, 207, 294/100; 901/31, 39
    See application file for complete search history.

(56) References Cited

U.S. PATENT DOCUMENTS

| | | | | |
|---|---|---|---|---|
| 1,814,368 A | * | 7/1931 | Chapman | B25B 9/00 294/106 |
| 1,938,419 A | * | 12/1933 | Freidlein | B25B 9/00 294/106 |
| 2,183,680 A | * | 12/1939 | Kahliff | H01R 4/64 294/106 |
| 2,654,632 A | * | 10/1953 | Herbert | B25B 9/00 294/116 |
| 2,669,478 A | * | 2/1954 | Bowie | H01J 9/006 294/116 |
| 3,013,517 A | * | 12/1961 | Isham | B63B 21/54 294/116 |
| 4,348,044 A | * | 9/1982 | Wood, III | B23Q 7/043 294/115 |
| 4,904,010 A | * | 2/1990 | Lacey | B25B 9/00 294/116 |
| 5,895,084 A | * | 4/1999 | Mauro | B25J 7/00 294/100 |
| 5,971,378 A | * | 10/1999 | Sweeney | B25B 5/10 269/6 |
| 7,014,235 B1 | * | 3/2006 | Ostwald | B25J 15/028 294/119.1 |
| 2012/0146351 A1 | * | 6/2012 | Oh | A01D 11/00 294/115 |

* cited by examiner

*Primary Examiner* — Paul T Chin
(74) *Attorney, Agent, or Firm* — Buckert Patent & Trademark Law Firm PC; John F. Buckert

(57) ABSTRACT

A clamping tool having an elongated housing, a handle, a thrust plate, a screw member, a linearly movable actuator, and first and second clamping arms is provided. When the handle and the screw member are rotated in a first rotational direction, the linearly movable actuator moves in a first longitudinal direction which induces first and second coupling members to slide within first and second end plate slots, respectively, of a first end plate of the linearly movable actuator, and the first and second clamping arms rotate about third and fourth coupling members, respectively, from a first operational position to a second operational position.

16 Claims, 14 Drawing Sheets

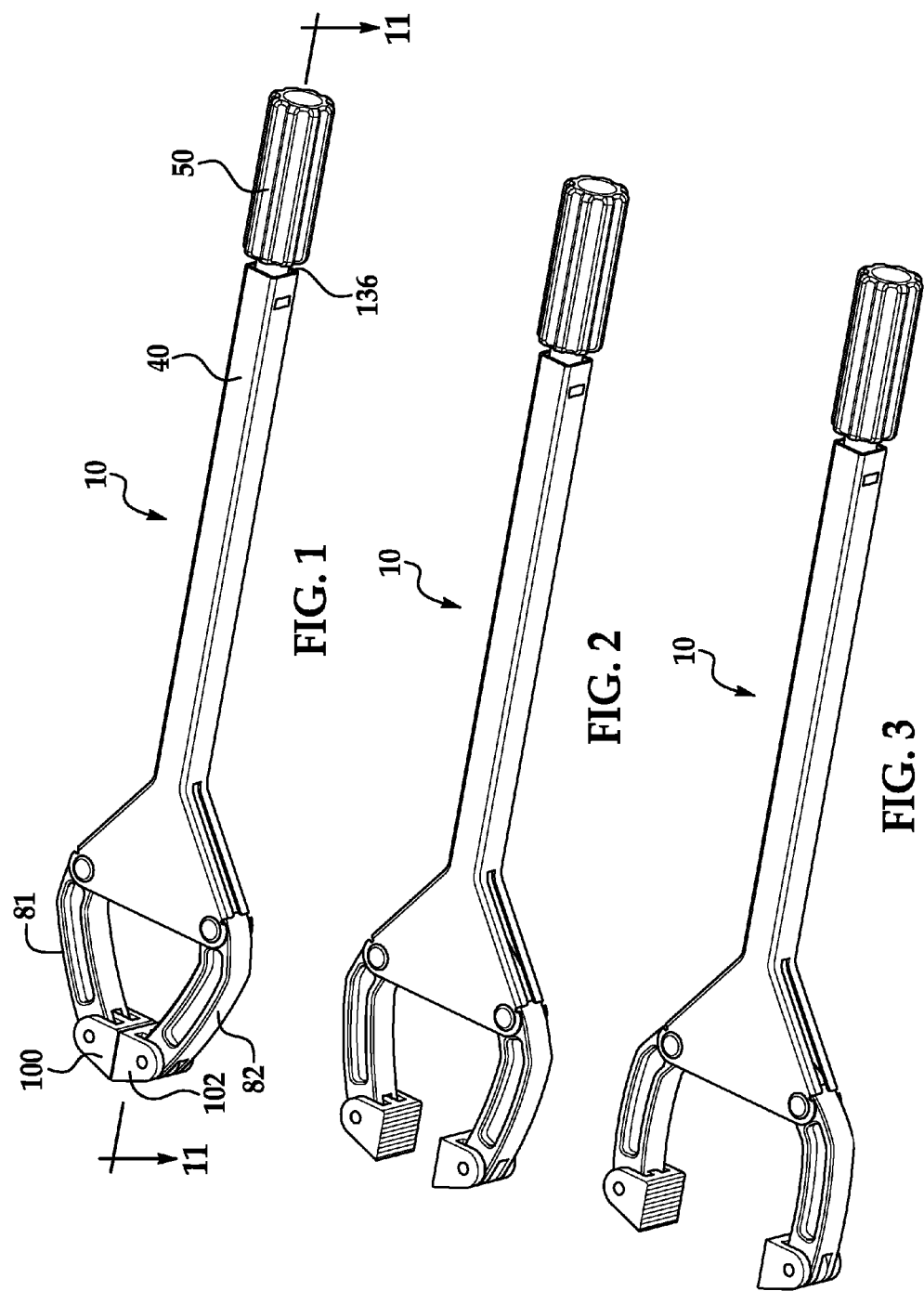

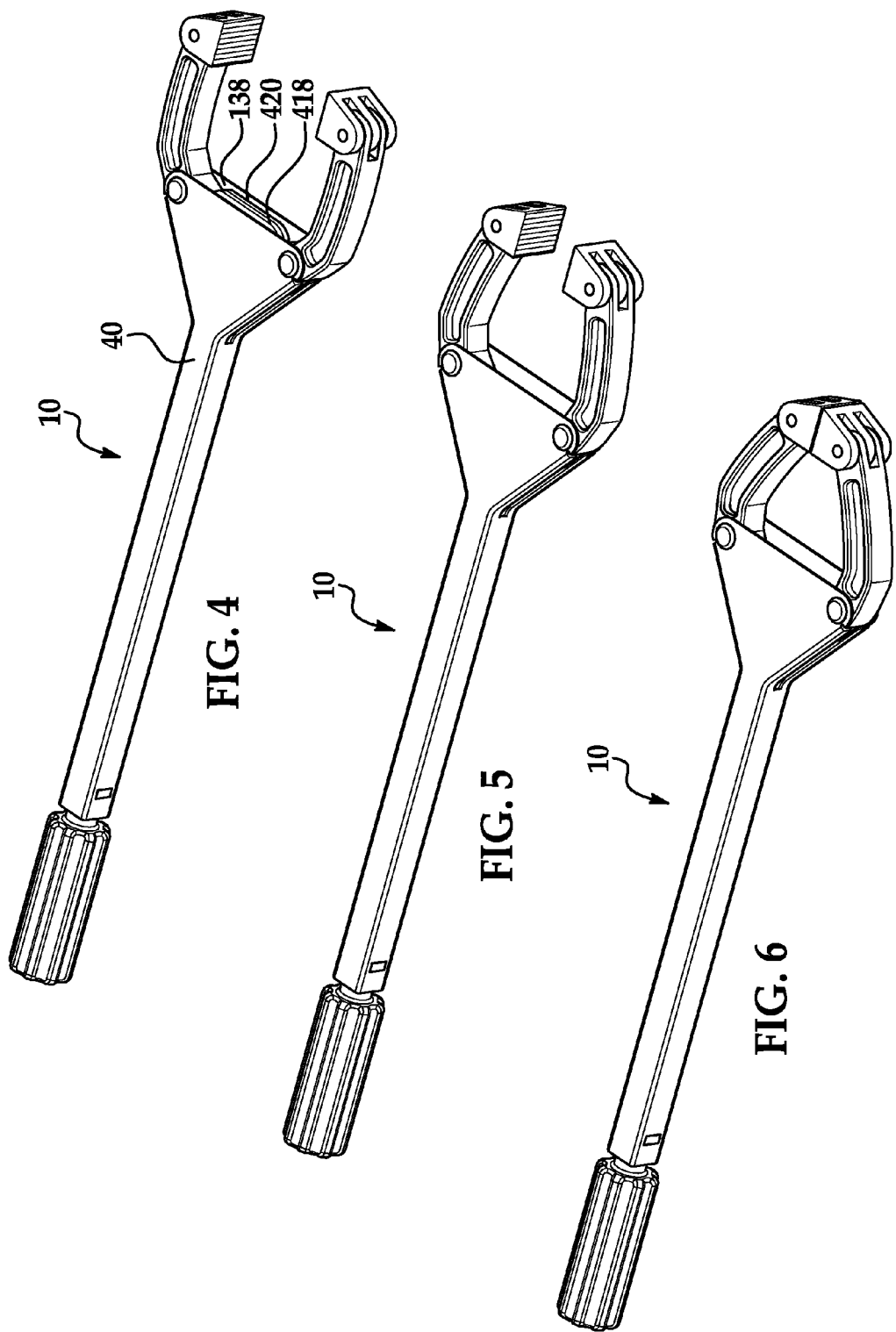

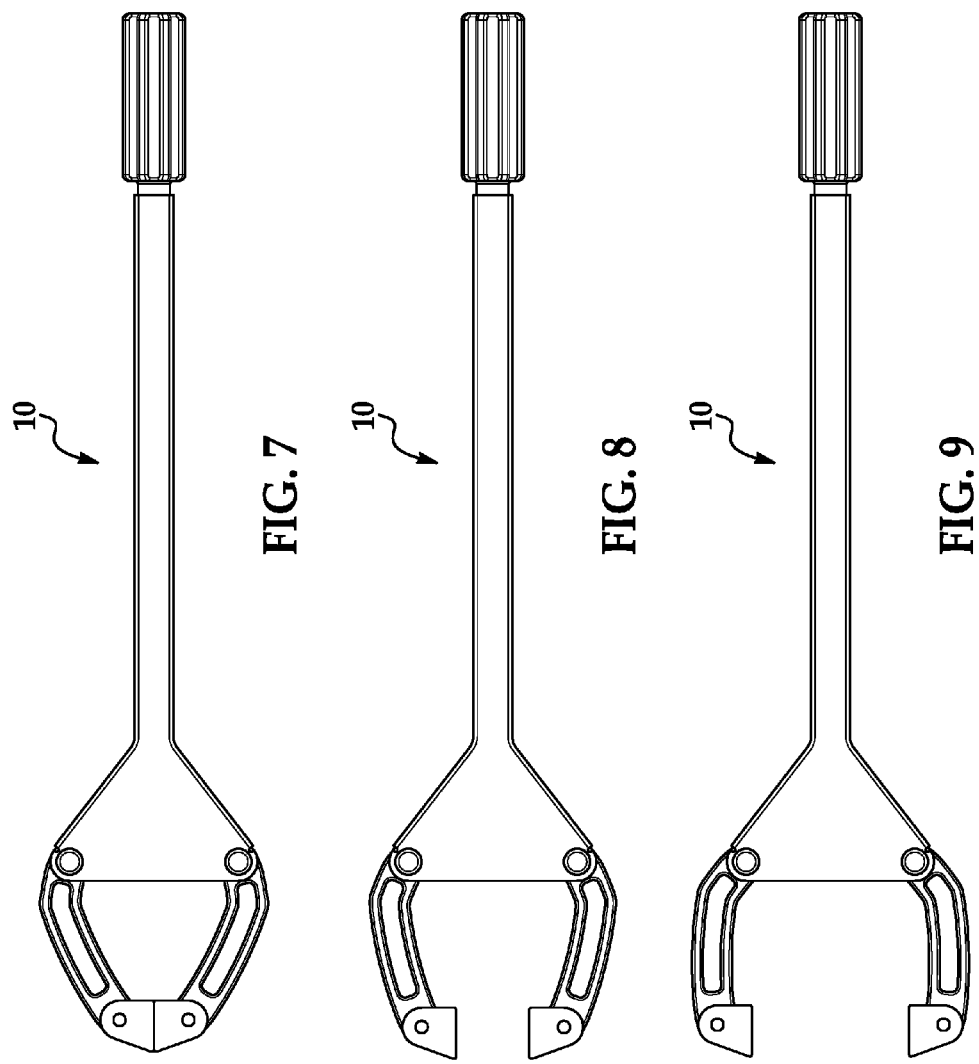

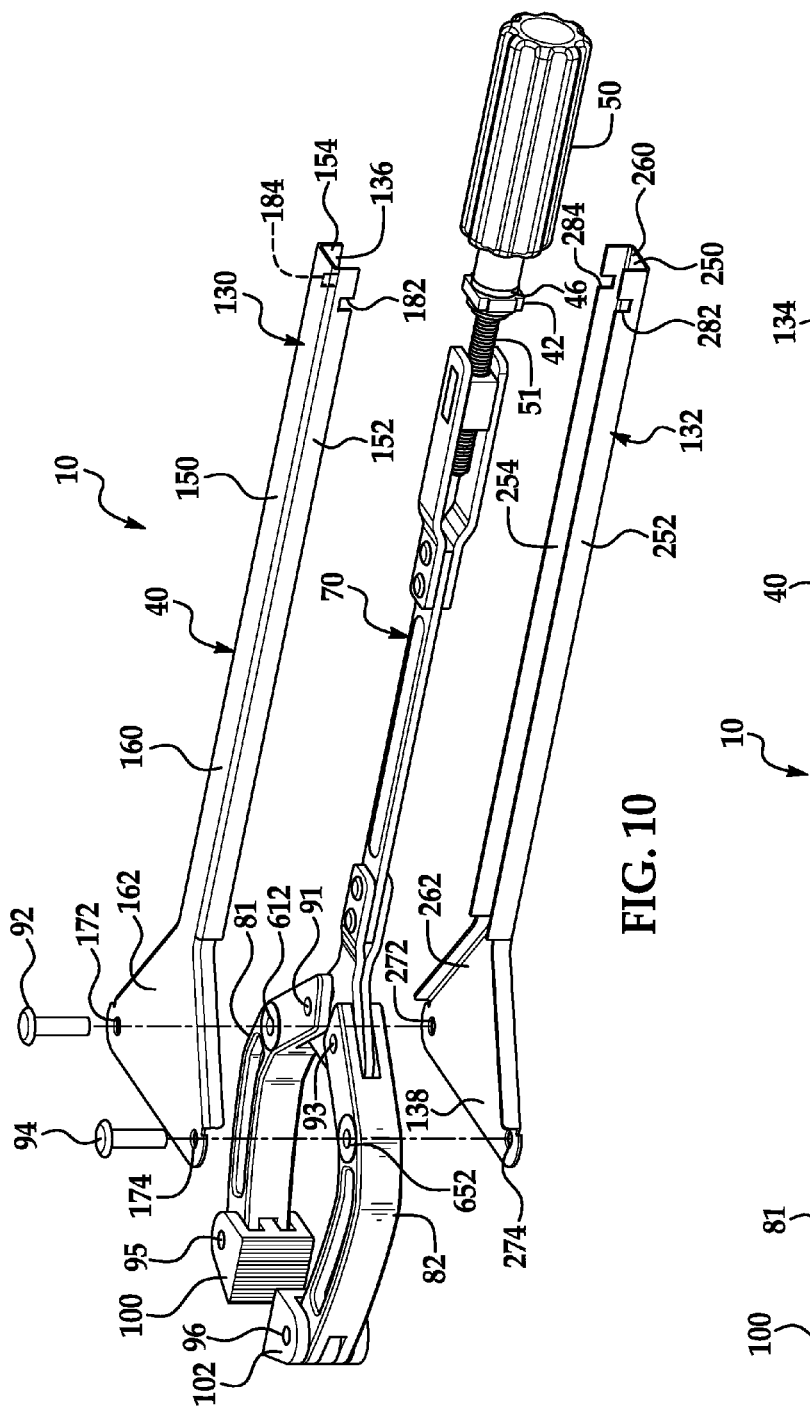
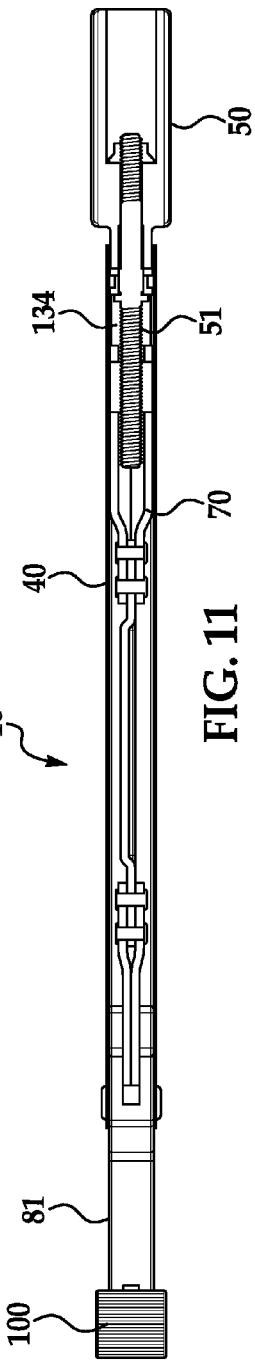
FIG. 10
FIG. 11

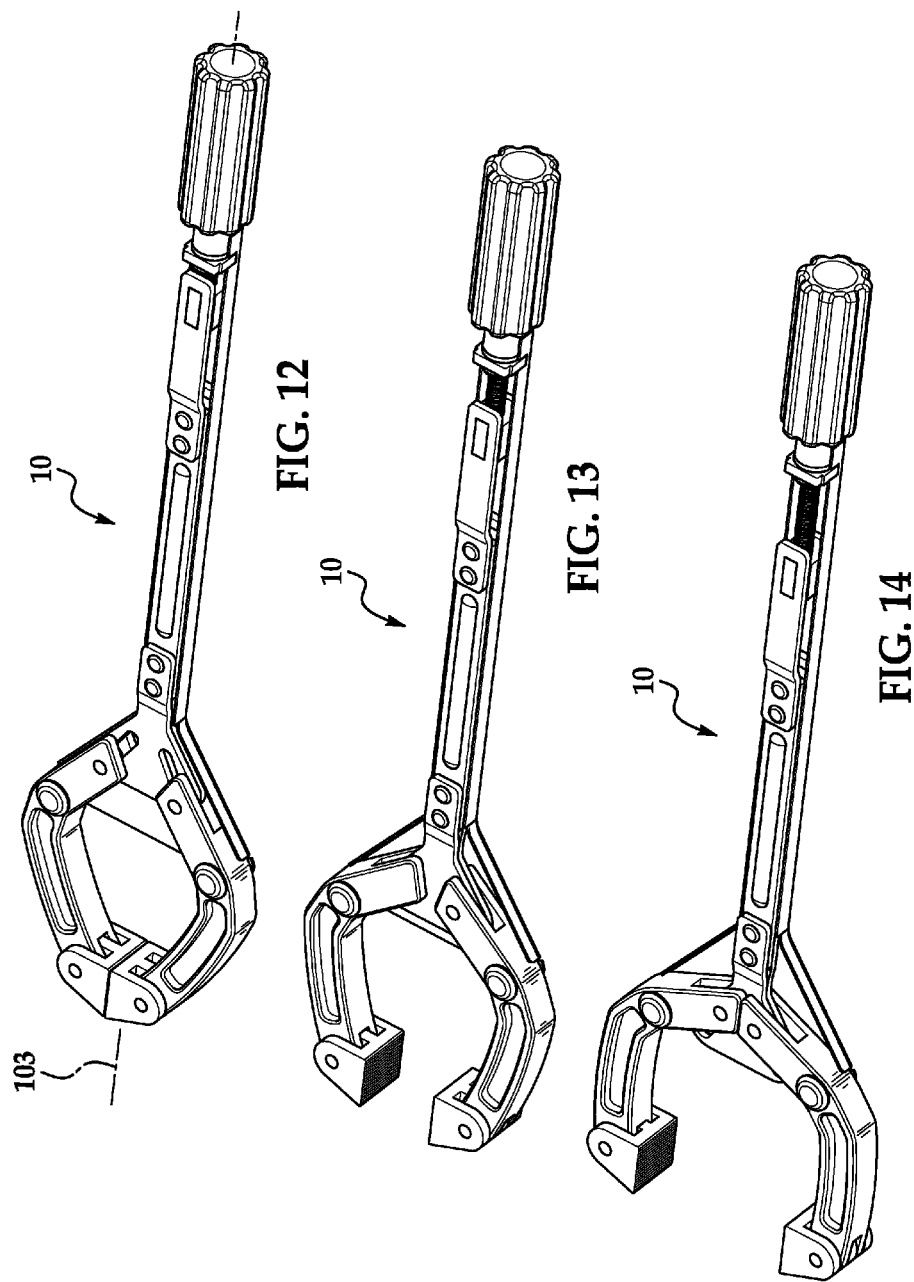

CLAMPING TOOL

CROSS-REFERENCE TO RELATED APPLICATIONS

This application claims priority to U.S. Provisional Patent Application No. 62/319,828 filed on Apr. 8, 2016, the entire contents of which are hereby incorporated by reference herein.

BACKGROUND

The inventor herein has recognized a need for an improved clamping tool.

SUMMARY

A clamping tool in accordance with an exemplary embodiment is provided. The clamping tool includes an elongated housing defining an interior region and having first and second open ends. The elongated housing extends along a longitudinal axis. The clamping tool further includes a thrust plate having an aperture extending therethrough. The thrust plate is disposed within and fixedly held in the interior region at a location proximate to the first open end. The clamping tool further includes a screw member having first and second shaft portions. The first shaft portion extends through the aperture of the thrust plate and is coupled to a handle. The second shaft portion is disposed in the interior region and has threads thereon. The clamping tool further includes a linearly movable actuator that is disposed in the interior region. The linearly movable actuator is threadably coupled to the threads of the second shaft portion of the screw member. The linearly movable actuator has a first end plate disposed proximate to the second open end of the elongated housing. The first end plate has first and second end plate slots extending therethrough. The clamping tool further includes a first clamping arm having first and second apertures extending therethrough. The clamping tool further includes a first coupling member that is disposed through the first aperture of the first clamping arm and the first end plate slot, and the first coupling member is slidably disposed in the first end plate slot. The clamping tool further includes a second coupling member that is disposed through a first aperture of the elongated housing and the second aperture of the first clamping arm. The first clamping arm is rotatable about the second coupling member. The clamping tool further includes a second clamping arm having first and second apertures extending therethrough. The clamping tool further includes a third coupling member that is disposed through the first aperture of the second clamping arm and the second end plate slot of the first end plate. The third coupling member is slidably disposed in the second end plate slot. The clamping tool further includes a fourth coupling member that is disposed through a second aperture of the elongated housing and the second aperture of the second clamping arm. The second clamping arm is rotatable about the fourth coupling member. When the handle and the screw member rotate in a first rotational direction, the linearly movable actuator moves in a first longitudinal direction which induces the first and third coupling members to slide within the first and second end plate slots, respectively, of the first end plate, and the first and second clamping arms rotate about the second and fourth coupling members, respectively, from a first operational position to a second operational position.

BRIEF DESCRIPTION OF THE DRAWINGS

FIG. 1 is a schematic of a clamping tool having a first operational position, in accordance with an exemplary embodiment;

FIG. 2 is a schematic of the clamping tool of FIG. 1 having a second operational position;

FIG. 3 is a schematic of the clamping tool of FIG. 1 having a third operational position;

FIG. 4 is another schematic of the clamping tool of FIG. 3 having the third operational position;

FIG. 5 is another schematic of the clamping tool of FIG. 2 having the second operational position;

FIG. 6 is another schematic of the clamping tool of FIG. 1 having the first operational position;

FIG. 7 is a side view of the clamping tool of FIG. 1 having the first operational position;

FIG. 8 is a side view of the clamping tool of FIG. 2 having the second operational position;

FIG. 9 is a side view of the clamping tool of FIG. 3 having the third operational position;

FIG. 10 is an exploded view of the clamping tool of FIG. 1;

FIG. 11 is a cross-sectional view of the clamping tool of FIG. 1 taken along lines 11-11 in FIG. 1;

FIG. 12 is a partial view of the clamping tool of FIG. 1 with an elongated housing removed therefrom and having the first operational position;

FIG. 13 is a partial view of the clamping tool of FIG. 2 with an elongated housing removed therefrom and having the second operational position;

FIG. 14 is a partial view of the clamping tool of FIG. 3 with an elongated housing removed therefrom and having the third operational position;

DETAILED DESCRIPTION

Figure 15:
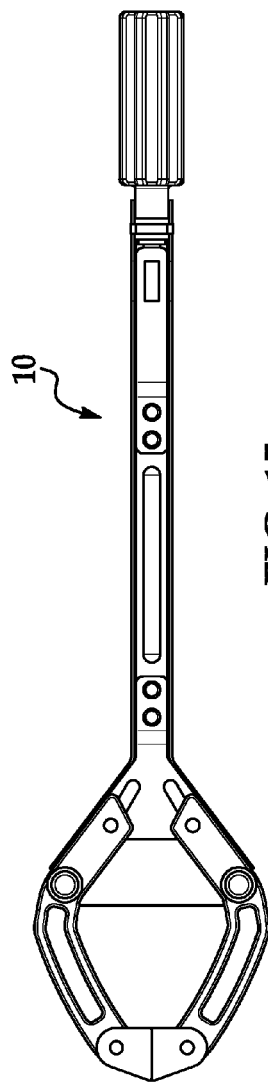
FIG. 15 is a side view of the clamping tool of FIG. 12 with an elongated housing removed therefrom and having the first operational position.
Figure 16:
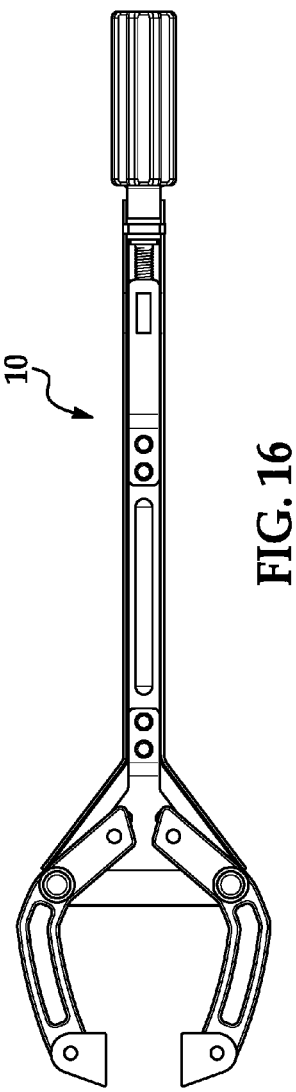
FIG. 16 is a side view of the clamping tool of FIG. 13 with an elongated housing removed therefrom and having the second operational position.
Figure 17:
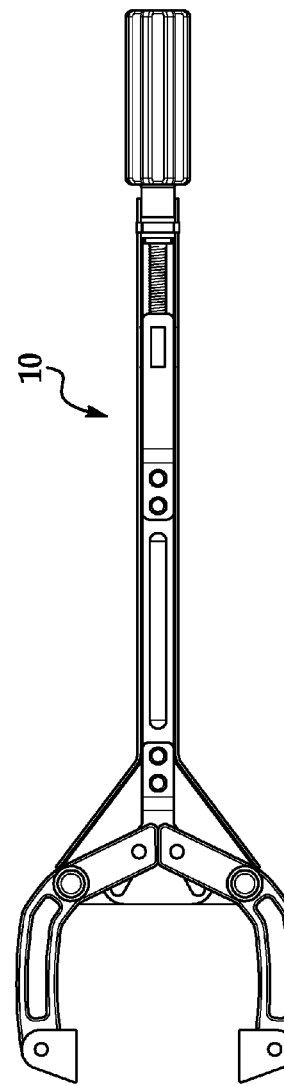
FIG. 17 is a side view of the clamping tool of FIG. 14 with an elongated housing removed therefrom and having the third operational position.

Referring to FIGS. 1-10, 18 and 23, a clamping tool 10 in accordance with an exemplary embodiment is provided. The clamping tool 10 includes an elongated housing 40, a thrust plate 42 (shown in FIG. 18), a straight bushing 46, a step bushing 48, a handle 50, a screw member 51, a nut 52, a linearly movable actuator 70 (shown in FIG. 10), clamping arms 81, 82, coupling members 91, 92, 93, 94, 95, 96, and clamping anvils 100, 102. An advantage of the clamping tool 10 is that the clamping tool 10 allows a user to rotate the handle 50 and the screw member 51 to linearly move the linearly movable actuator 70 to move the clamping arms 81, 82 to a plurality of operational positions for clamping and holding an object with and between the clamping anvils 100, 102, and releasing the clamped object.

Referring to FIGS. 10 and 11, the elongated housing 40 is provided to hold a portion of the components of the clamping tool 10 therein. The elongated housing 40 includes elongated housing portions 130, 132 that are coupled together to define an interior region 134 therebetween. The elongated housing 40 has an open end 136 (shown in FIG. 1) at a first end of the elongated housing 40, and an open end 138 (shown in FIG. 4) at a second end of the elongated housing 40.

The elongated housing portion 130 includes an outer wall 150 and side walls 152, 154. The outer wall 150 has a rectangular-shaped wall portion 160 and a triangular-shaped wall portion 162. The rectangular-shaped wall portion 160 is coupled to and extends from the triangular-shaped wall portion 162. The triangular-shaped wall portion 162 includes apertures 172, 174 extending therethrough. The side wall 152 is coupled to and extends downwardly from a first edge of the rectangular-shaped wall portion 160 and a first edge of the triangular-shaped wall portion 162. The side wall 152 includes an aperture 182 extending therethrough. Further, the side wall 154 is coupled to and extends downwardly from a second edge of the rectangular-shaped wall portion 160 and a second edge of the triangular-shaped wall portion 162. The side wall 154 includes an aperture 184 extending therethrough. In an exemplary embodiment, the elongated housing portion 130 is constructed of a metal, such as steel or aluminum for example. In an alternative embodiment, the elongated housing portion 130 is constructed of plastic.

The elongated housing portion 132 has an identical structure as the elongated housing portion 130. In particular, the elongated housing portion 132 includes an outer wall 250 and side walls 252, 254. The outer wall 250 has a rectangular-shaped wall portion 260 and a triangular-shaped wall portion 262. The rectangular-shaped wall portion 260 is coupled to and extends from the triangular-shaped wall portion 262. The triangular-shaped wall portion 262 includes apertures 272, 274 extending therethrough. The side wall 252 is coupled to and extends downwardly from a first edge of the rectangular-shaped wall portion 260 and a first edge of the triangular-shaped wall portion 262. The side wall 252 includes an aperture 282 extending therethrough. Further, the side wall 254 is coupled to and extends downwardly from a second edge of the rectangular-shaped wall portion 260 and a second edge of the triangular-shaped wall portion 262. The side wall 254 includes an aperture 284 extending therethrough. In an exemplary embodiment, the elongated housing portion 132 is constructed of a metal, such as steel or aluminum for example. In an alternative embodiment, the elongated housing portion 132 is constructed of plastic. In an exemplary embodiment, the side walls 252, 254 of the elongated housing 132 are welded to the side walls 152, 154, respectively, of the elongated housing 130.

Figure 18:
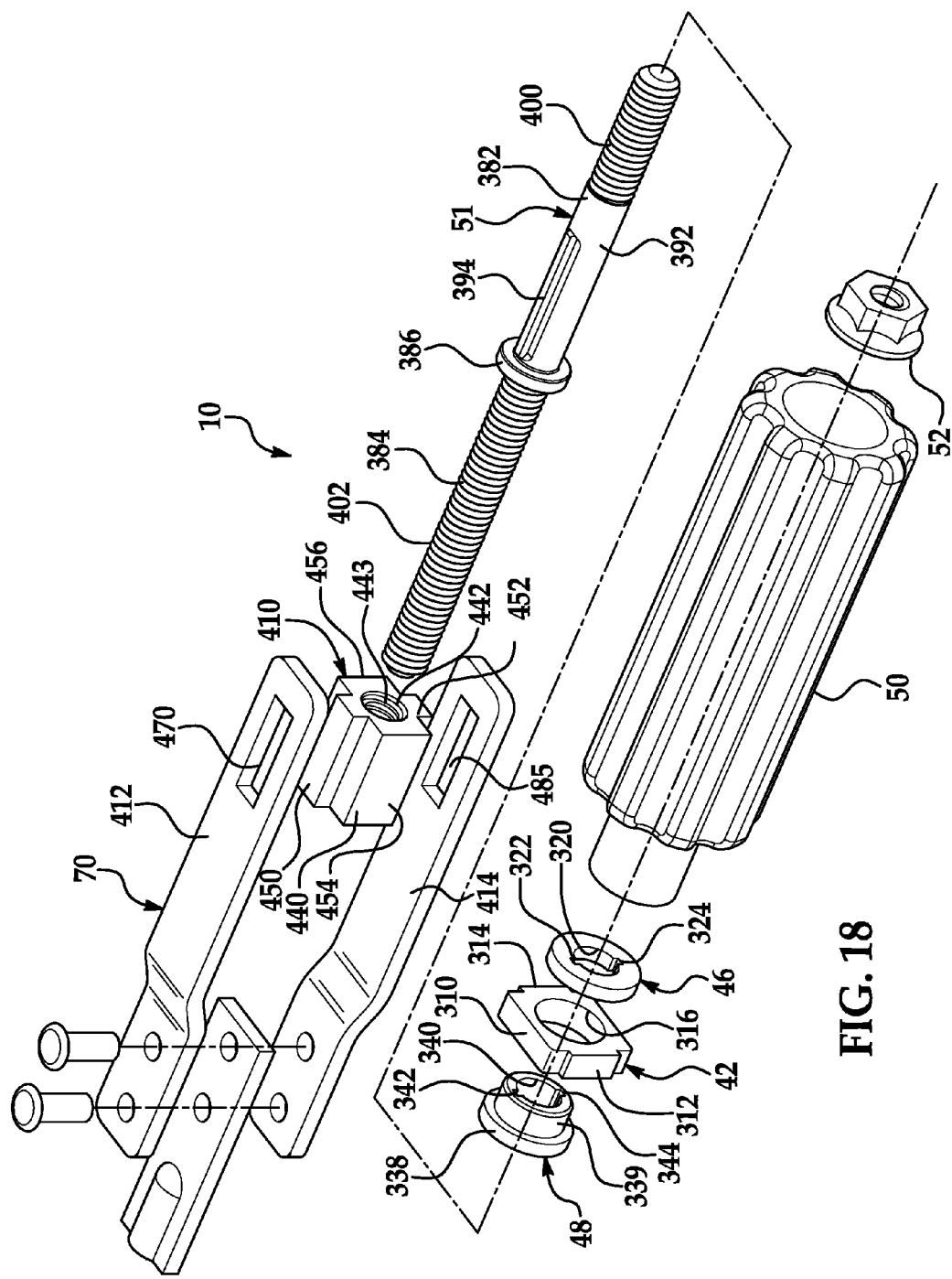
FIG. 18 is an exploded view of a first portion of the clamping tool of FIG. 1.

Referring to FIGS. 10 and 18, the thrust plate 42 includes a substantially rectangular shaped body 310 and extension portions 312, 314. The extension portions 312, 314 are coupled to and extend outwardly from first and second sides of the rectangular-shaped body 310. The rectangular-shaped body 310 has an aperture 316 extending therethrough that is sized to receive a small-diameter portion 339 of the step bushing 48 therethrough. The thrust plate 42 is disposed within the interior region 134 (shown in FIG. 11) of the elongated housing 40. Further, the extension portion 312 extends at least partially through an aperture defined by the apertures 182, 282 of the elongated housing portions 130, 132, respectively, and the extension portion 314 extends at least partially through an aperture defined by the apertures 184, 284 of the elongated housing portions 130, 132, respectively—to fixedly hold the thrust plate 42 at a predetermined location proximate to the open end 136 of elongated housing 40. In an exemplary embodiment, the thrust plate 42 is constructed of a metal, such as steel or aluminum for example. In an alternative embodiment, the thrust plate 42 is constructed of plastic.

Referring to FIGS. 18-21, the straight bushing 46 is disposed between the thrust plate 42 and the handle 50. The straight bushing 46 has an aperture 320 extending therethrough that is sized to receive the first shaft portion 382 of the screw member 51 therethrough. The straight bushing 46 includes grooves 322, 324 communicating with the aperture 320 that are configured to receive ribs, 394, 396 (shown in FIG. 19), respectively, of the first shaft portion 382 of the screw member 51 therein. In an exemplary embodiment, the straight bushing 46 is constructed of a metal, such as steel or aluminum for example. In an alternative embodiment, the straight bushing 46 is constructed of plastic.

The step bushing 48 is disposed between the thrust plate 42 and a shoulder portion 386 of the screw member 51. The step bushing 48 has a large-diameter portion 338 coupled to a small-diameter portion 339. The step bushing 48 further includes an aperture 340 extending through both the large-diameter portion 338 and the small-diameter portion 339 that is sized to receive the first shaft portion 382 of the screw member 51 therethrough. The step bushing 48 includes grooves 342, 344 communicating with the aperture 340 that are configured to receive ribs, 394, 396 (shown in FIG. 19), respectively, of the first shaft portion 382 of the screw member 51 therein. In an exemplary embodiment, the step bushing 48 is constructed of a metal, such as steel or aluminum for example. In an alternative embodiment, the step bushing 48 is constructed of plastic.

Figure 19:
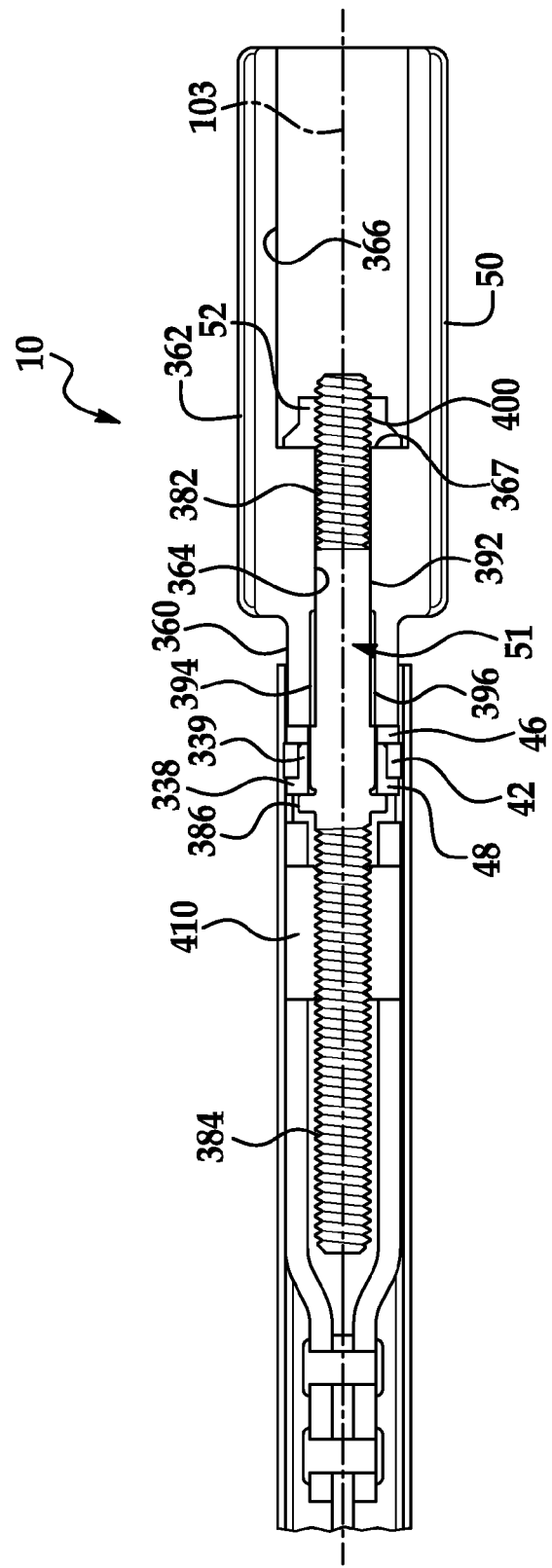
FIG. 19 is a side view of a first portion of the clamping tool when the clamping tool has the first operational position.
Figure 20:
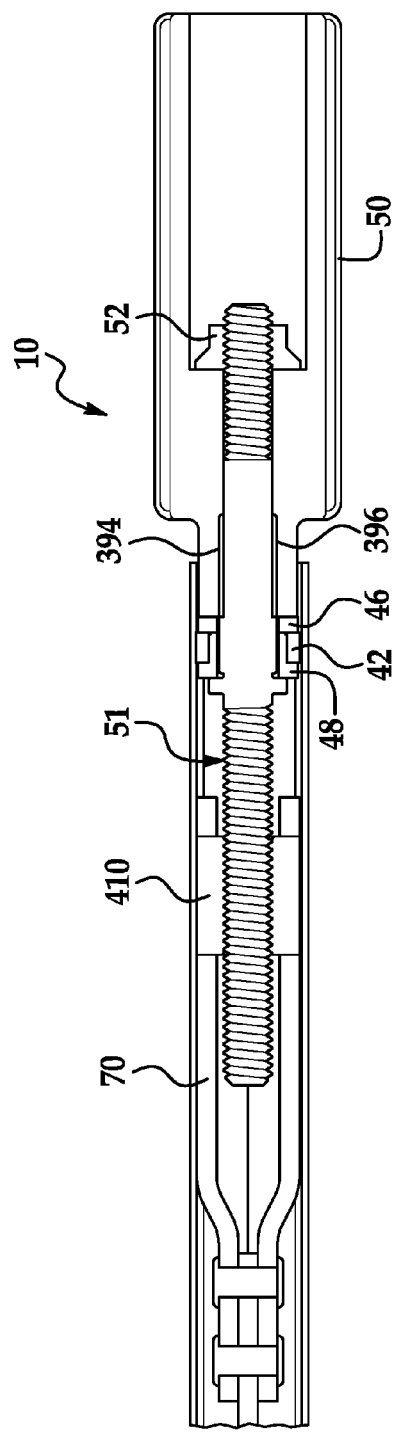
FIG. 20 is a side view of the first portion of the clamping tool when the clamping tool has the second operational position.
Figure 21:
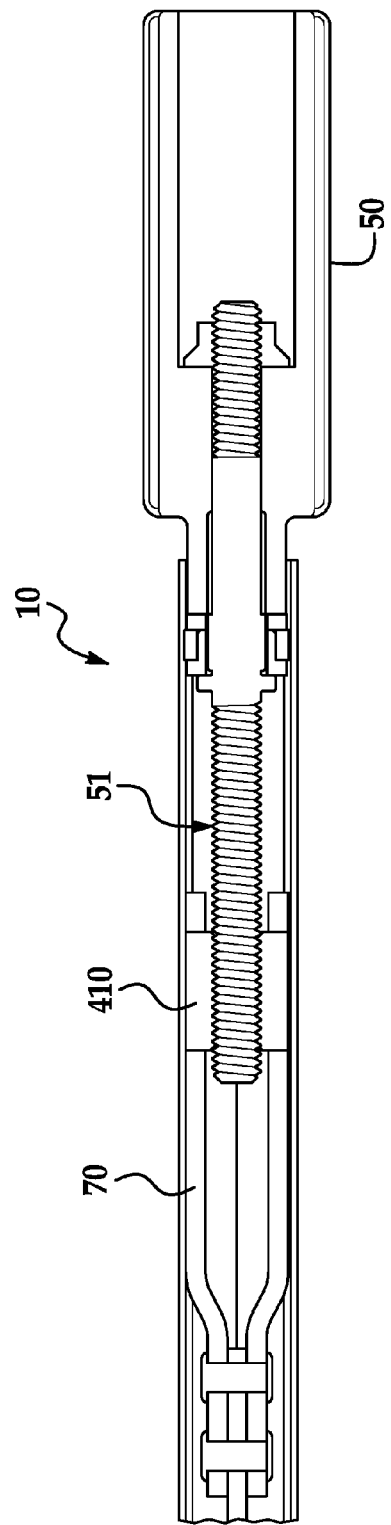
FIG. 21 is a side view of the first portion of the clamping tool when the clamping tool has the third operational position.

Referring to FIGS. 18 and 19, the handle 50 is coupled to the screw member 51 for rotating the screw member 51. The handle 50 includes an end portion 360 and a main body portion 362. An aperture 364 extends through the end portion 360 and further through a first portion of the main body portion 362. An aperture 366 extends through a second portion of the main body portion 362, and communicates with the aperture 364. The apertures 364, 366 define an internal ledge 367 configured to receive the nut 52 thereon. In an exemplary embodiment, the handle 50 is constructed of plastic.

The screw member 51 is provided to move the linearly movable actuator 70 in a first direction along the longitudinal axis 103 when the screw member 51 is rotated in a first rotational direction, and to move the linearly movable actuator 70 in a second direction along the longitudinal axis 103 when the screw member 51 is rotated in a second rotational direction opposite to the first rotational direction. The screw member 51 includes a first shaft portion 382, a second shaft portion 384, and a shoulder portion 386.

The shoulder portion 386 is disposed between and coupled to the first and second shaft portions 382, 384. The shoulder portion 386 has a diameter larger than a diameter of the first shaft portion 382, and larger than a diameter of the second shaft portion 384.

The first shaft portion 382 includes an unthreaded surface 392 extending from the shoulder portion 386 towards a first end of the first shaft portion 382. The first shaft portion 382 has ribs 394, 396 extending outwardly from the unthreaded surface 392 that are received in first and second grooves, respectively, in the end portion 360 of the handle 50. The first shaft portion 382 further includes threads 400 extending from an end of the unthreaded surface 392 toward the first end of the first shaft portion 382. The first shaft portion 382 extends through the aperture 340 of the step bushing 48, the aperture 316 of the thrust plate 42, the aperture 320 of the straight bushing 46, the aperture 364 of the handle 50, and partially through the aperture 366 of the handle 50 such that the threads 400 communicate with the aperture 366 within the handle 50. The nut 52 is threadably coupled to the threads 400 of the first shaft portion 382, and the shoulder portion 386 of the screw member 51 abuts against the step bushing 48 such that the handle 50 is attached to the combination of the screw member 51, the step bushing 48, and the straight bushing 46. Further, the screw member 51 is adapted to rotate about the longitudinal axis 103 relative to the thrust plate 42 when the handle 50 is rotated.

The second shaft portion 384 includes threads 402 thereon. The second shaft portion 384 extends from the shoulder portion 386 in a longitudinal direction opposite to the first shaft portion 382. The second shaft portion 384 is disposed in the interior region 134 (shown in FIG. 11). The threads 402 of the second shaft portion 384 are threadably received in a nut 410 of the linearly movable actuator 70.

Figure 22:
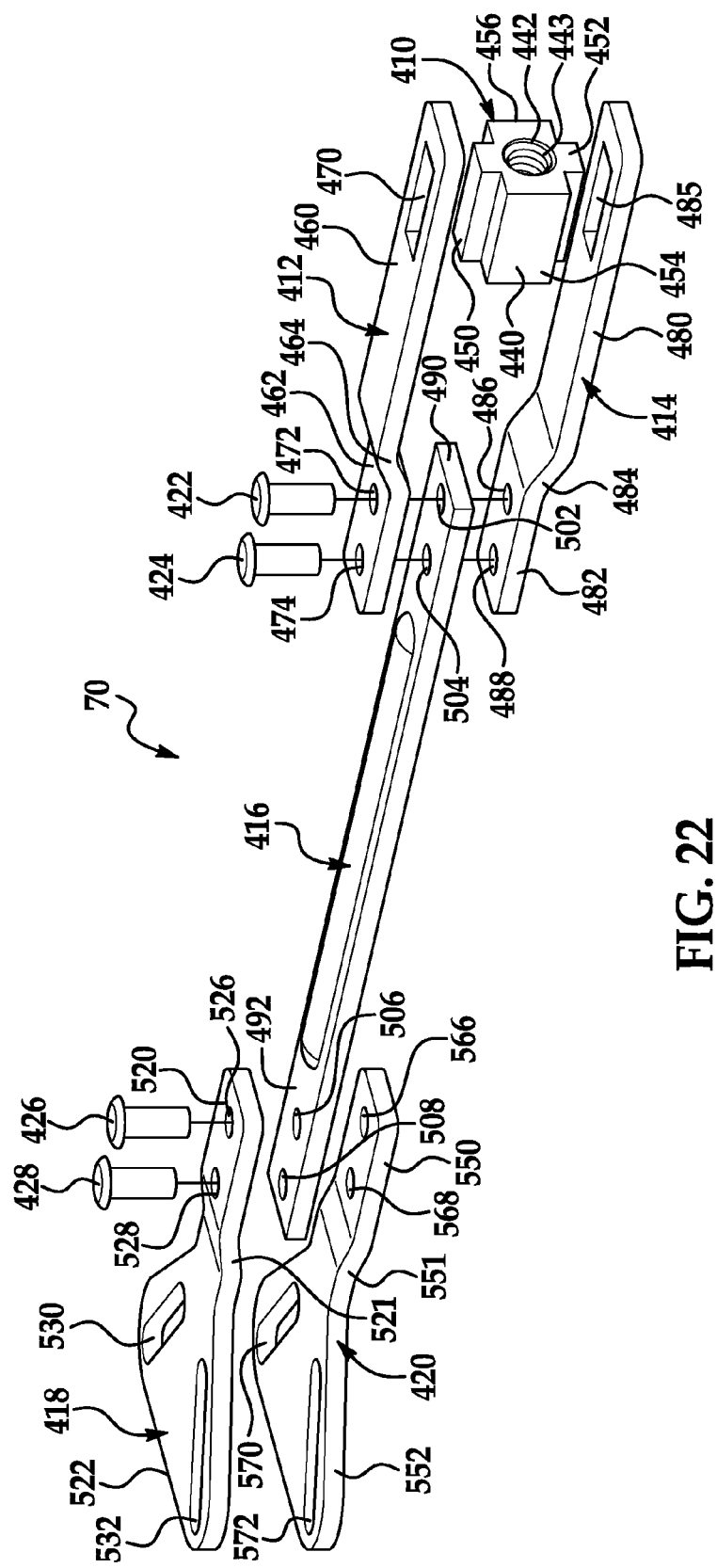
FIG. 22 is an exploded view of a linearly movable actuator utilized in the clamping tool of FIG. 1.

Referring to FIGS. 10, 18 and 22, the linearly movable actuator 70 is provided to move the clamping arms 81, 82 to a plurality of operational positions. The linearly movable actuator 70 is at least partially disposed within the interior region 134 (shown in FIG. 11) of the elongated housing 40. The linearly movable actuator 70 includes a nut 410, arm portions 412, 414, a central shaft 416, end plates 418, 420, and coupling members 422, 424, 426, 428.

The nut 410 has a cross-shaped body 440 having extension portions 450, 452, 454, 456. The nut 410 further includes an aperture 442 extending therethrough that defines internal threads 443. The extension portion 450 is at least partially disposed within a slot 470 of the arm portion 412, and the extension portion 452 is at least partially disposed within a slot 485 of the arm portion 414—to fixedly hold the nut 410 against and between the arm portions 412, 414. The extension portion 454 is configured to slidably engage the side walls 152, 252, respectively, of the elongated housing portions 130, 132, respectively within the interior region 134. Further, the extension portion 456 is configured to slidably engage the side walls 154, 254, respectively, of the elongated housing portions 130, 132, respectively, within the interior region 134. The internal threads 443 are threadably coupled to the threads 402 of the second shaft portion 384 of the screw member 51. In an exemplary embodiment, the nut 410 is constructed of a metal, such as steel or aluminum for example. In an alternative embodiment, the nut 410 is constructed of plastic.

The arm portion 412 includes rectangular-shaped portions 460, 462 and a bent portion 464. The bent portion 464 is disposed between and coupled to the rectangular-shaped portions 460, 462. The rectangular-shaped portion 460 includes the slot 470 extending therethrough. The rectangular-shaped portion 462 includes apertures 472, 474 extending therethrough. In an exemplary embodiment, the arm portion 412 is constructed of a metal, such as steel or aluminum for example. In an alternative embodiment, the arm portion 412 is constructed of plastic.

The arm portion 414 includes rectangular-shaped portions 480, 482 and a bent portion 484. The bent portion 484 is disposed between and coupled to the rectangular-shaped portions 480, 482. The rectangular-shaped portion 480 includes the slot 485 extending therethrough. The rectangular-shaped portion 482 includes apertures 486, 488 extending therethrough. In an exemplary embodiment, the arm portion 414 is constructed of a metal, such as steel or aluminum for example. In an alternative embodiment, the arm portion 414 is constructed of plastic.

Referring to FIG. 22, the central shaft 416 has a first end portion 490 and a second portion 492. The first end portion 490 includes apertures 502, 504 extending therethrough. The second portion 492 includes apertures 506, 508 extending therethrough. The first end portion 490 is coupled to the arm portions 412, 414. In particular, coupling member 422 is disposed through the aperture 472 of the arm portion 412, and the aperture 502 of the central shaft 416, and the aperture 486 of the arm portion 414—to couple the first end portion 490 of the central shaft 416 to and between the arm portions 412, 414. Further, the coupling member 424 is disposed through the aperture 474 of the arm portion 412, and the aperture 504 of the central shaft 416, and the aperture 488 of the arm portion 414—to couple the first end portion 490 of the central shaft 416 to and between the arm portions 412, 414. In an exemplary embodiment, the coupling members 422, 424 are rivets. The second end portion 492 is coupled to the end plates 418, 420 as will be explained in greater detail below.

Figure 23:
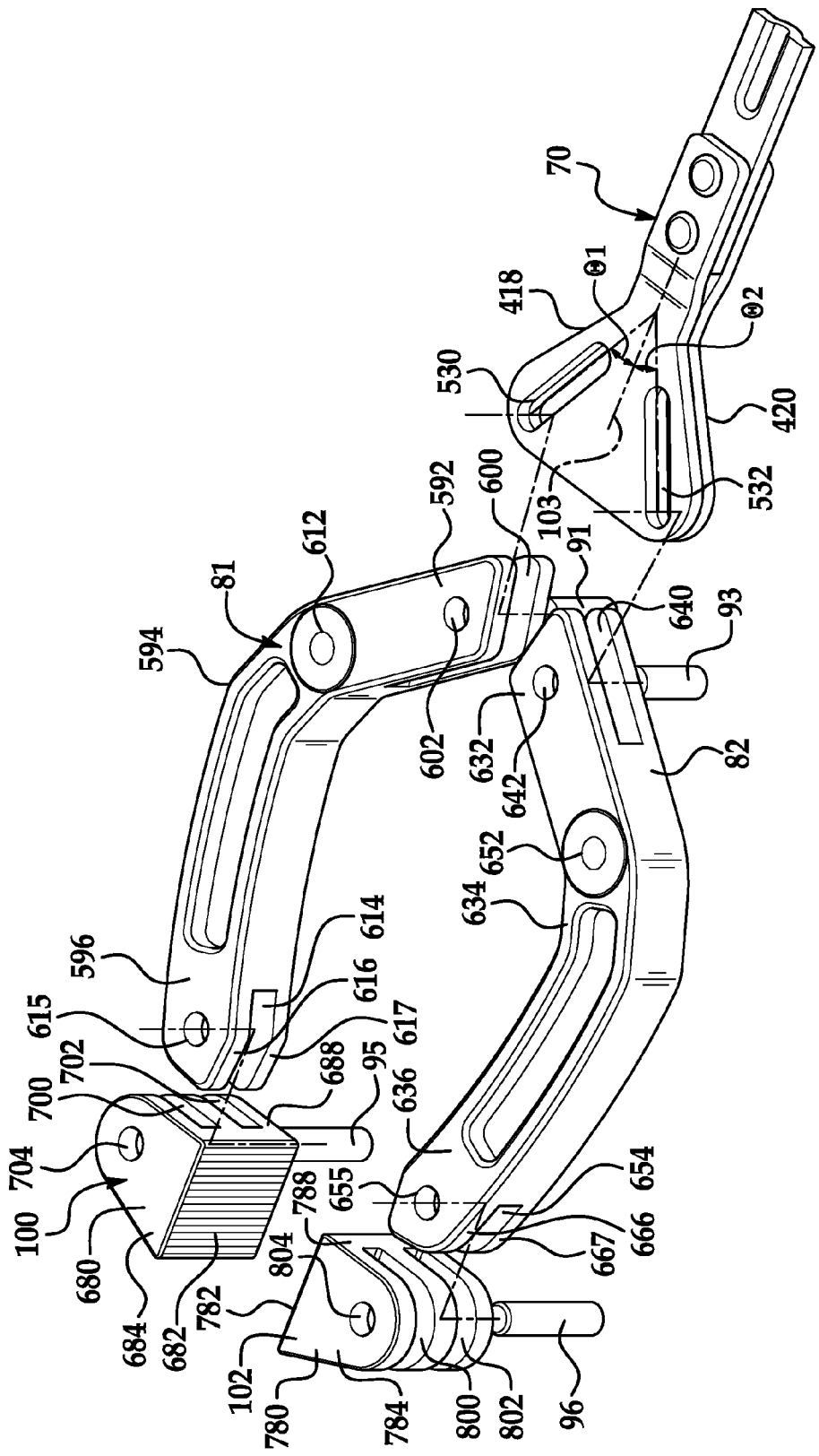
FIG. 23 is an exploded view of a second end of the clamping tool of FIG. 1.

Referring to FIGS. 22 and 23, the end plate 418 is coupled to the second end portion 492 of the central shaft 416 and is provided to move the clamping arms 81, 82. The end plate 418 is disposed proximate to the open end 138 (shown in FIG. 4) of the elongated housing 40. The end plate 418 includes a rectangular-shaped portion 520, a bent portion 521, and a triangular-shaped portion 522. The bent portion 521 is coupled to and between the rectangular-shaped portion 520 and the triangular-shaped portion 522. The rectangular-shaped portion 520 includes apertures 526, 528 extending therethrough. Further, the triangular-shaped portion 522 includes end plate slots 530, 532 extending therethrough. The end plate slots 530, 532 extend away from one another along first and second acute angles θ1, θ2 (shown in FIG. 23), respectively, relative to the longitudinal axis 103. In an exemplary embodiment, the end plate 418 is constructed of a metal, such as steel or aluminum for example. In an alternative embodiment, the end plate 418 is constructed of plastic.

The end plate 420 is coupled to the second end portion 492 of the central shaft 416 and is provided to move the clamping arms 81, 82. The end plate 420 is disposed proximate to the open end 138 (shown in FIG. 4) of the elongated housing 40. The end plate 420 includes a rectangular-shaped portion 550, a bent portion 551, and a triangular-shaped portion 552. The bent portion 551 is coupled to and between the rectangular-shaped portion 550 and the triangular-shaped portion 552. The rectangular-shaped portion 550 includes apertures 566, 568 extending therethrough. Further, the triangular-shaped portion 552 includes end plate slots 570, 572 extending therethrough. The end plate slots 570, 572 extend away from one another along first and second acute angles θ3, θ4 (shown in FIG. 24), respectively, relative to the longitudinal axis 103. The triangular-shaped portion 522 of the end plate 418 is disposed directly against the triangular-shaped portion 552 of the end plate 420. Further, the end plate slots 530, 532 of the triangular-shaped portion 522 of the end plate 418 are aligned with and overlap the end plate slots 570, 572, respectively, of the triangular-shaped portion 552 of the end plate 420. In an exemplary embodiment, the end plate 420 is constructed of a metal, such as steel or aluminum for example. In an alternative embodiment, the end plate 420 is constructed of plastic.

The coupling member 426 is disposed through the aperture 526 of the end plate 418, the aperture 506 of the central shaft 416, and the aperture 566 of the end plate 420—to couple the end plates 418, 420 to the central shaft 416. Further, the coupling member 428 is disposed through the aperture 528 of the end plate 418, the aperture 508 of the central shaft 416, and the aperture 568 of the end plate 420—to couple the end plates 418, 420 to the central shaft 416. In an exemplary embodiment, the coupling members 426, 428 are rivets.

Figure 24:
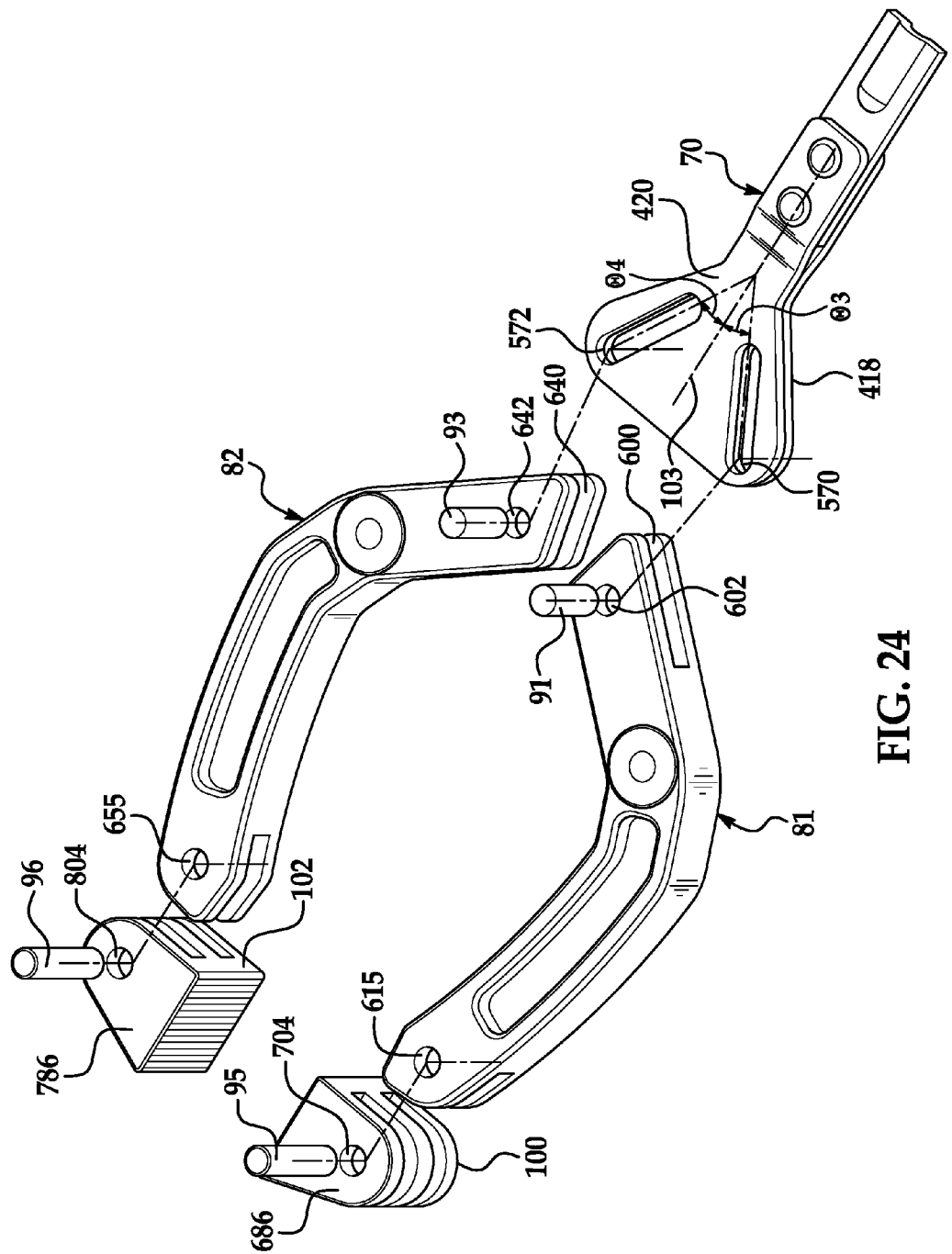
FIG. 24 is another exploded view of the second end of the clamping tool of FIG. 1.
Figure 25:
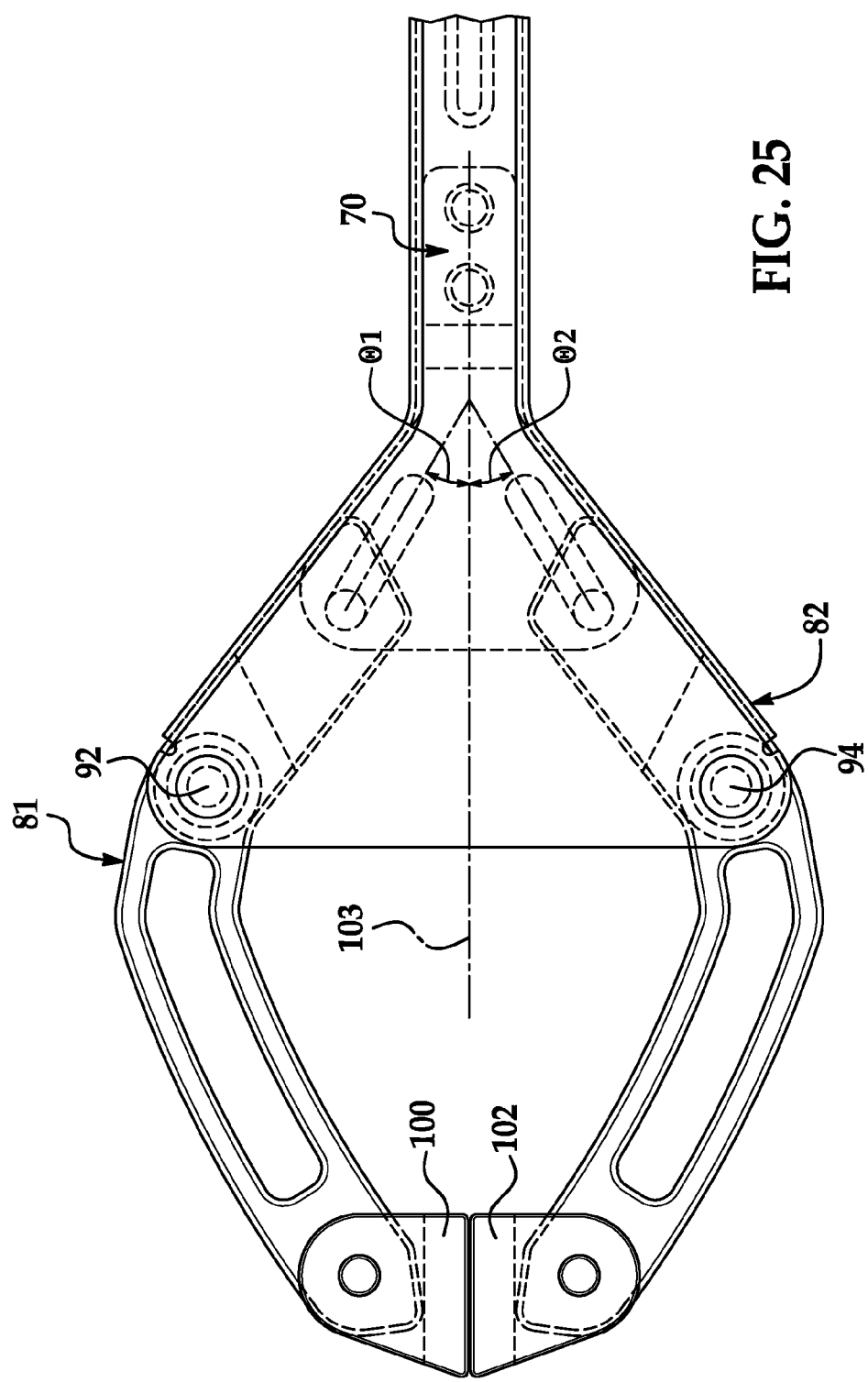
FIG. 25 is a side view of the second end of the clamping tool of FIG. 1 when the clamping tool has the first operational position.
Figure 26:
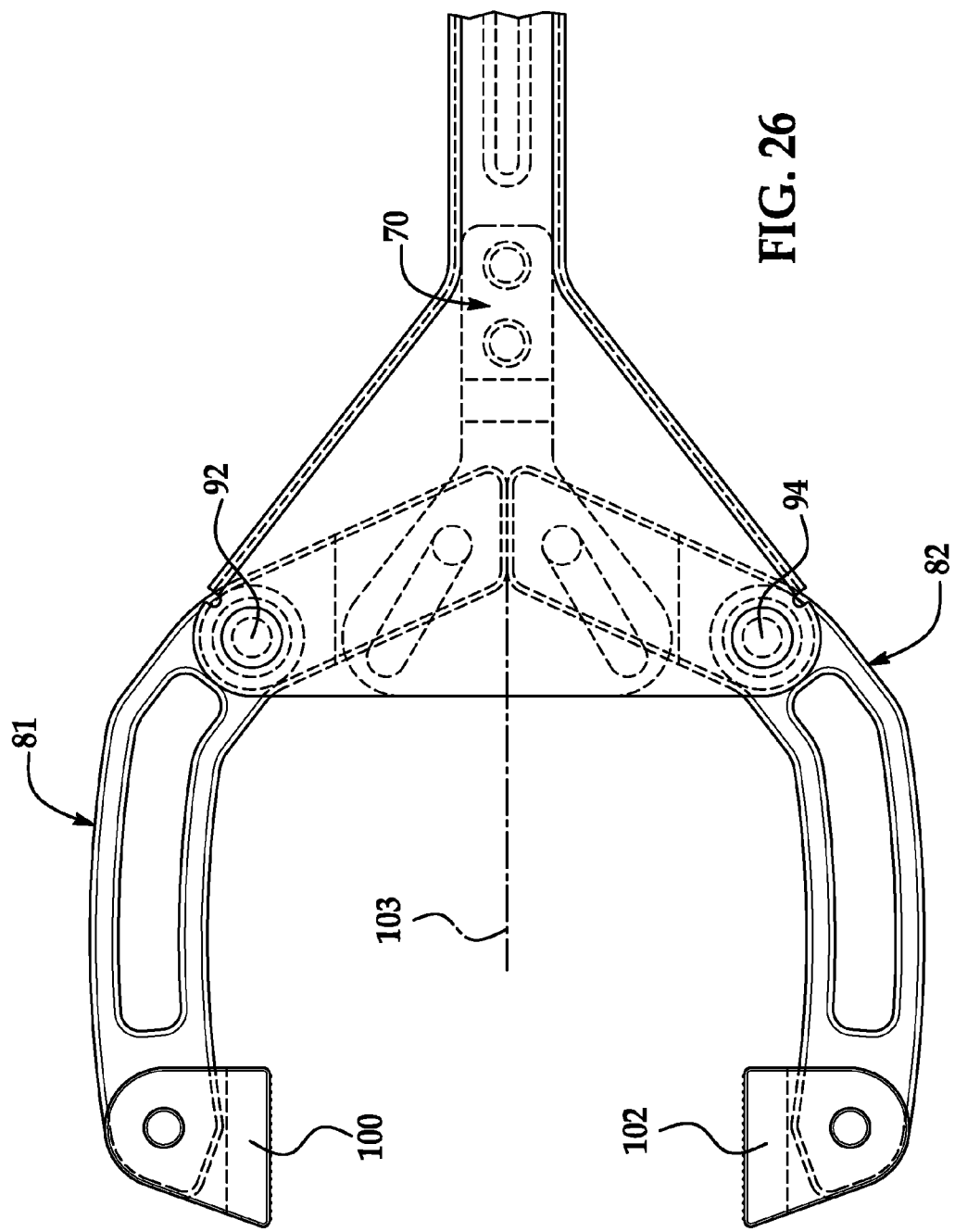
FIG. 26 is a side view of the second end of the clamping tool of FIG. 1 when the clamping tool has the third operational position.

Referring to FIGS. 10, 23 and 24, the clamping arm 81 is provided to be slidably coupled to the end plates 418, 420 of the linearly movable actuator 70, and rotatably coupled to the elongated housing 40. The clamping arm 81 is substantially arcuate-shaped and includes a first end portion 592, a central body portion 594, and a second end portion 596. The central body portion 594 is disposed between and coupled to the first end portion 592 and the second end portion 596. The first end portion 592 includes a clamping arm groove 600 extending into a first end of the first end portion 592. The first end portion 592 further includes an aperture 602 extending therethrough that communicates with the clamping arm groove 600. The central body portion 594 includes an aperture 612 extending therethrough. The second end portion 596 includes a clamping arm groove 614 extending into a first end of the second end portion 596. The second end portion 596 further includes an aperture 615 extending therethrough that communicates with the clamping arm groove 614. The second end portion 596 further includes first and second extension portions 616, 617 disposed on opposite sides of the clamping arm groove 614. Further, a portion of the end plate 418 that is proximate to the end plate groove 530 thereof is disposed in the clamping arm groove 600, and a portion of the end plate 420 that is proximate to the end plate groove 570 thereof is disposed in the clamping arm groove 600.

Referring to FIGS. 23 and 24, the coupling member 91 is disposed through the aperture 602 of the clamping arm 81, the clamping arm groove 600, and the end plate slots 530, 570 of the end plates 418, 420, respectively—such that the coupling member 91 is slidably disposed in the end plate slots 530, 570. In an exemplary embodiment, the coupling member 91 is a rivet.

Referring to FIGS. 10 and 23, the coupling member 92 is disposed through the aperture 172 of the elongated housing portion 130, and the aperture 612 of the central body portion 594 of the clamping arm 81, and the aperture 272 of the elongated housing portion 132—to rotatably couple the clamping arm 81 to the elongated housing 40. In an exemplary embodiment, the coupling member 92 is a rivet.

The clamping arm 82 is provided to be slidably coupled to the end plates 418, 420 of the linearly movable actuator 70, and rotatably coupled to the elongated housing 40. The clamping arm 82 is substantially arcuate-shaped and includes a first end portion 632, a central body portion 634, and a second end portion 636. The central body portion 634 is disposed between and coupled to the first end portion 632 and the second end portion 636. The first end portion 632 includes a clamping arm groove 640 extending into a first end of the first end portion 632. The first end portion 632 further includes an aperture 642 extending therethrough that communicates with the clamping arm groove 640. The central body portion 634 includes an aperture 652 extending therethrough. The second end portion 636 includes a clamping arm groove 654 extending into a first end of the second end portion 636. The second end portion 636 further includes an aperture 655 extending therethrough that communicates with the clamping arm groove 654. The second end portion 636 further includes first and second extension portions 666, 667 disposed on opposite sides of the clamping arm groove 654. Further, a portion of the end plate 418 that is proximate to the end plate groove 532 thereof is disposed in the clamping arm groove 640, and a portion of the end plate 420 that is proximate to the end plate groove 570 thereof is disposed in the clamping arm groove 640.

Referring to FIGS. 23 and 24, the coupling member 93 is disposed through the aperture 642 of the clamping arm 82, the clamping arm groove 640, and the end plate slots 532, 572 of the end plates 418, 420, respectively—such that the coupling member 93 is slidably disposed in the end plate slots 532, 572. In an exemplary embodiment, the coupling member 93 is a rivet.

Referring to FIGS. 10 and 23, the coupling member 94 is disposed through the aperture 174 of the elongated housing portion 130, and the aperture 652 of the central body portion 634 of the clamping arm 82, and the aperture 274 of the elongated housing portion 132—to rotatably couple the clamping arm 82 to the elongated housing 40. In an exemplary embodiment, the coupling member 94 is a rivet.

Referring to FIGS. 23-26, the clamping anvil 100 is rotatably coupled to an end of the clamping arm 81. The clamping anvil 100 includes a dome-shaped body 680 having a clamping surface 682, side surfaces 684, 686, and an arcuate-shaped surface 688. The clamping anvil 100 further includes clamping anvil slots 700, 702 extending into the dome-shaped body 680 and spaced apart from one another. The clamping anvil 100 further includes an aperture 704 extending therethrough from the side surface 684 to the side surface 686 which communicates with the clamping anvil slots 700, 702. Further, the first and second extension portions 616, 617 of the second end portion 596 of the first clamping arm 81 extend into the clamping anvil slots 700, 702, respectively. Also, the coupling member 95 extends through the aperture 704 of the clamping anvil 100, and the aperture 615 of the clamping arm 81 to rotatably couple the clamping anvil 100 to the clamping arm 81.

The clamping anvil 102 is rotatably coupled to an end of the clamping arm 82. The clamping anvil 102 includes a dome-shaped body 780 having a clamping surface 782, side surfaces 784, 786, and an arcuate-shaped surface 788. The clamping anvil 102 further includes clamping anvil slots 800, 802 extending into the dome-shaped body 780 and spaced apart from one another. The clamping anvil 102 further includes an aperture 804 extending therethrough from the side surface 784 to the side surface 786 which communicates with the clamping anvil slots 800, 802. Further, the first and second extension portions 666, 667 of the second end portion 636 of the clamping arm 82 extend into the clamping anvil slots 800, 802, respectively. Also, the coupling member 96 extends through the aperture 804 of the clamping anvil 102, and the aperture 655 of the clamping arm 82 to rotatably couple the clamping anvil 102 to the clamping arm 82.

Referring to FIGS. 10, 12 and 23-26, during operation, when a user rotates the handle 50 (and the screw member 51 coupled to the handle 50) in a first rotational direction about the longitudinal axis 103, the linearly movable actuator 70 moves in a first longitudinal direction (leftwardly in FIG. 25) along the longitudinal axis 103 which induces both the coupling member 91 to slide (generally rightwardly in FIG. 25) within the end plate slots 530, 570 of the end plates 418, 420, respectively, and the coupling member 93 to slide (generally rightwardly in FIG. 25) within the end plate slots 532, 572 of the end plates 418, 420, respectively. In response, the clamping arms 81, 82 rotate about the coupling members 92, 94, respectively, from a first operational position (shown in FIG. 25) toward another operational position (shown in FIG. 26).

Alternately, when the user rotates the handle 50 (and the screw member 51 coupled to the handle 50) in a second rotational direction about the longitudinal axis 103 opposite to the first rotational direction, the linearly movable actuator 70 moves in a second longitudinal direction (rightwardly in FIG. 26) along the longitudinal axis 103 which induces both the coupling member 91 to slide (generally leftwardly in FIG. 26) within the end plate slots 530, 570 of the end plates 418, 420, respectively, and the coupling member 93 to slide (generally leftwardly in FIG. 26) within the end plate slots 532, 572 of the end plates 418, 420, respectively. In response, the clamping arms 81, 82 rotate about the coupling members 92, 94, respectively, from an operational position (shown in FIG. 26) toward the first operational position (shown in FIG. 25).

The clamping tool described herein provides a substantial advantage over other tools. In particular, the clamping tool allows a user to rotate a handle and a screw member to linearly move the linearly movable actuator to move the a pair of clamping arms to selected operational positions for clamping and holding an object with and between a pair of clamping anvils, and for releasing the clamped object.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A clamping tool, comprising:
   an elongated housing defining an interior region and having first and second open ends, the elongated housing extending along a longitudinal axis;
   a thrust plate having an aperture extending therethrough; the thrust plate being disposed within and fixedly held in the interior region at a location proximate to the first open end;
   a screw member having first and second shaft portions, the first shaft portion extending through the aperture of the thrust plate and being coupled to a handle, the second shaft portion being disposed in the interior region and having threads thereon;
   a linearly movable actuator being disposed in the interior region, the linearly movable actuator being threadably coupled to the threads of the second shaft portion of the screw member; the linearly movable actuator having a first end plate disposed proximate to the second open end of the elongated housing, the first end plate having first and second end plate slots extending therethrough;
   a first clamping arm having first and second apertures extending therethrough;
   a first coupling member being disposed through the first aperture of the first clamping arm and the first end plate slot, and the first coupling member being slidably disposed in the first end plate slot;
   a second coupling member being disposed through a first aperture of the elongated housing and the second aperture of the first clamping arm, the first clamping arm being rotatable about the second coupling member;
   a second clamping arm having first and second apertures extending therethrough;
   a third coupling member being disposed through the first aperture of the second clamping arm and the second end plate slot of the first end plate, the third coupling member being slidably disposed in the second end plate slot;
   a fourth coupling member being disposed through a second aperture of the elongated housing and the second aperture of the second clamping arm, the second clamping arm being rotatable about the fourth coupling member;
   such that when the handle and the screw member rotate in a first rotational direction, the linearly movable actuator moves in a first longitudinal direction which induces the first and third coupling members to slide within the first and second end plate slots, respectively, of the first end plate, and the first and second clamping arms rotate about the second and fourth coupling members, respectively, from a first operational position to a second operational position.

2. The clamping tool of claim 1, wherein when the handle and the screw member rotate in a second rotational direction opposite to the first rotational direction, the linearly movable actuator moves in a second longitudinal direction which induces the first and third coupling members to slide within the first and second end plate slots, respectively, of the first end plate, and the first and second clamping arms rotate about the second and fourth coupling members, respectively, from the second operational position toward the first operational position.

3. The clamping tool of claim 1, wherein the elongated housing further includes first and second slots extending therethrough proximate to the first open end; the thrust plate being at least partially disposed in the first and second slots such that the thrust plate is fixedly held by the elongated housing within the interior region.

4. The clamping tool of claim 1, wherein the screw member further includes a shoulder portion, the shoulder portion being disposed between and coupled to the first and second shaft portions, the shoulder portion having a diameter larger than a diameter of the first shaft portion and larger than a diameter of the second shaft portion.

5. The clamping tool of claim 4, further comprising:
   a first bushing being disposed between and contacting the handle and the thrust plate; the first bushing having an aperture extending therethrough;
   a step bushing being disposed against the thrust plate such that the thrust plate is disposed between the step bushing and the first bushing, the step bushing having an aperture extending therethrough; and the shoulder portion of the screw member being disposed directly against the step bushing, and the first shaft portion of the screw member extending through the aperture of the step bushing, the aperture of the thrust plate, and the aperture of the first bushing such that an end of the first shaft portion is coupled to the handle.

6. The clamping tool of claim 1, wherein the linearly movable actuator includes a nut, first and second arm portions, a central shaft, and the first end plate;

the first and second arm portions being coupled to a first end portion of the central shaft, the nut being coupled to and between the first and second arm portions, the nut having internal threads that are threadably coupled to the threads of the second shaft portion of the screw member; and the first end plate being coupled to a second end portion of the central shaft.

7. The clamping tool of claim 6, wherein the linearly movable actuator further includes a second end plate;

the second end plate being coupled to the second end portion of the central shaft, the second end plate having third and fourth end plate slots extending therethrough that are aligned and overlap with the first and second end plate slots, respectively, of the first end plate;

the first coupling member being further disposed through the third end plate slot of the second end plate, and the first coupling member being further slidably disposed in the third end plate slot; and the third coupling member being further disposed through the fourth end plate slot of the second end plate, and the third coupling member being slidably disposed in the fourth end plate slot.

8. The clamping tool of claim 1, wherein the elongated housing comprises:

a first elongated housing portion; and a second elongated housing portion coupled to the first elongated housing portion.

9. The clamping tool of claim 8, wherein the first elongated housing portion includes:

an outer wall having a rectangular-shaped wall portion and a triangular-shaped wall portion, the rectangular-shaped wall portion being coupled to and extending from the triangular-shaped wall portion;

a first side wall being coupled to and extending downwardly from a first edge of the rectangular-shaped wall portion and a first edge of the triangular-shaped wall portion; and a second side wall being coupled to and extending downwardly from a second edge of the rectangular-shaped wall portion and a second edge of the triangular-shaped wall portion.

10. The clamping tool of claim 1, wherein the first clamping arm further includes a first clamping arm groove extending into a first end of the first clamping arm, a portion of the first end plate that is proximate to the first end plate groove being disposed in the first clamping arm groove.

11. The clamping tool of claim 10, wherein the second clamping arm further includes a second clamping arm groove extending into a first end of the second clamping arm, a portion of the first end plate that is proximate to the second end plate groove being disposed in the second clamping arm groove.

12. The clamping tool of claim 11, further comprising a first clamping anvil rotatably coupled to a second end of the first clamping arm.

13. The clamping tool of claim 12, further comprising a second clamping anvil rotatably coupled to a second end of the second clamping arm.

14. The clamping tool of claim 13, wherein the first and second clamping anvils contact one another when the first and second clamping arms are at the first operational position.

15. The clamping tool of claim 14, wherein the first and second clamping anvils are disposed apart from one another when the first and second clamping arms are at the second operational position.

16. The clamping tool of claim 1, wherein first and second end plate slots extend at first and second acute angles, respectively, relative to the longitudinal axis.

* * * * *